Patented June 17, 1941

2,245,843

UNITED STATES PATENT OFFICE 2,245,843

LUMINESCENT MATERIAL

Ludwig Wesch, Heidelberg, Germany, assignor to Telefunken Gesellschaft für Drahtlose Telegraphie m. b. H., Berlin, Germany, a corporation of Germany No Drawing. Application June 13, 1939, Serial No. 278,905. In Germany March 26, 1938

11 Claims. (Cl. 250—81)

The invention relates to the manufacture of luminescent materials or phosphors used to convert or transduce radiant energy of ultra-violet, X-ray, cathode-ray or other radiations into visible light.

Most of the methods known in the art resort to the sinter furnace to make phosphors at high temperatures. The raw materials are mixed with activating metals and the mixture is placed in a crucible which is placed in a furnace in which the production of the phosphor is completed within a fixed period of time and at predetermined temperatures. After the heating treatment, the content of the crucible is finely ground and reheated in case there has been destruction of the luminescent properties by the grinding.

Now, it has been ascertained that phosphors so made possess a comparatively small efficiency, although by considerations of theoretical physics the useful effect should be really high, since measurements have brought out the fact that for each absorbed quantum of light a luminous quantum is given off or emitted. Thus, the efficiency of conversion should be unity, in other words, the ratio between the absorbed and the emitted radiation in a thin layer or film should be equal to one.

Now, the invention is predicated upon a proper appreciation of the fact that the actual impairment or loss of efficiency of conversion is ascribable to the circumstance that the total raw material in the course of the sintering process does not acquire luminous centers, with the result that a major portion of the material does not become activated and merely has an absorbing action. Moreover, because of the thickness of the depth of the layers of luminescent material customarily employed in practice, there is occasioned an essential loss or diminution of the emitted light inside the pulverulent phosphor. The maximum thickness of a layer of these substances which is still pervious to the exciting energy is around .05 mm., and the result is that the whole energy which is produced at greater depths in the substrata becomes wholly absorbed. Another fact is that the light, because of the granular condition of the powder, is subject to marked diffusion or scatter, and where the material is used for the re-creation of pictures on luminescent screens, this must conduce to a lack of sharpness, that is, to blur.

Now, the aim and purpose of the invention is to raise the efficiency by obviating the above named difficulties, to the end of thereby enlarging the technical and commercial utility of phosphors. More particularly speaking, such phosphors shall be made accessible and be opened up to technological uses whose dielectric constant experiences alterations when irradiated by light, in other words, substances which are adapted to a conversion of luminous energy into frequency variations of a transmitter as known in the art.

According to the invention, the starting materials or raw materials of phosphors which are rid of activating metals, are mixed and fused to result in plates or slabs of phosphors whose activation is accomplished by causing the activating metallic agent to migrate into the phosphor plate by thermal and/or electrolytic ways and means.

By the thermal or electrolytic migration of the activating metal into the phosphor plate or sheet according to the invention there results a perfectly uniform distribution of the activator inside the phosphor matrix or base so that, contradistinct to the prior art, no essential part of the starting material will remain inactive so far as luminous conversion is concerned. The plate thus consists purely of uniformly divided phosphor or luminescent centers, without the presence of any "filler." Moreover, the invention constitutes an essential progress because of the reduction of the coefficient of absorption (or absorptivity) of the material for fluorescent or phosphorescent light for the reason that the material is completely transparent, or practically so. While in the case of phosphor powders it would be useless to raise the depth or thickness of the coat or layer beyond the $5/100$-mm. mark, on the ground that no more light would reach the surface from greater depths it is now possible to obtain a greater luminous density on the surface because it is now feasible to use heavier layers, seeing that light rising from greater depths hardly suffers any absorption.

By utilizing the entire basic or matrix material, and by reducing the absorptivity according to the invention, the field of application of the material is greatly expanded. Among the uses to which the improved screens and material may be placed are luminous numbers, dials, clocks and watches (time pieces), etc.; moreover, the uses in Roentgenology and in television apparatus predicated upon the use of cathode-rays in the form of luminescent screens, luminescent foils, as the active material in a condenser, etc. will result in improved efficiency and effects.

Examining, for example, a luminescent screen of the kind used in television apparatus, it will be found that the picture is re-created upon the posterior face, while it is viewed from the front.

In the use of luminescent screens of the kind heretofore employed, the ensuing images were impaired in quality and detail because of absorption in the very coat (high absorptivity) and breaking-up or separating process due to the constituent grains of the phosphor powder and finally because of the grain size of the powder itself. For in case of an increase in size, the grains of the filler exercise a disturbing effect in reference to the grains of the phosphor. Another circumstance is that the powder can scarcely be comminuted to a grain size less than $\frac{1}{1000}$ of one millimeter without suffering relatively appreciable losses in luminescence or luminosity.

By my invention all of these shortcomings are obviated. For such light, as is caused by cathode-rays, reaches the surface undiminished in intensity; there is no scatter by the granulated phosphor, while actions by the filler or grain size itself are absent since a body or substance resembling glass is dealt with, which is uniformly activated by the activating "centers," the distance between "centers" in the body probably being somewhat greater than the cross-section of action of a "center," that is, $5 \times 10^{-6}$ mm. Even under maximum magnification, this "raster" or the grain size will not become appreciable. What has here been stated respecting the use of the material in the television art, holds true, a fortiori, also in the case of luminescent screens employed in roentgenology.

Accordingly, it will be appreciated that one of the main objects of my invention is to provide an improved luminescent material and screen together with a method for providing such screens and materials.

A further object of my invention is to provide a new method for activating luminescent materials to increase their efficiency.

Another object of my invention is to provide an electrolytic method for activating luminescent materials more uniformly.

Still another object of my invention is to provide a luminescent screen which shall be free from granular structure to increase light transmission efficiency and to provide a screen which preserves maximum amount of detail in reproduction of television images.

Other objects and advantages of my invention will become clear from a reading of the following detailed description.

The method of the invention comprises the following steps or stages: The starting or raw materials such as sulfides, selenides, tellurides, oxides, carbonates, silicates, zirconates, titanates, molybdates, tungstates, borates, etc., are fused in an annealing furnace into a clear melt and/or crystallized, optionally in the presence of high pressures. To insure higher conductivity, if desired, salts may be used of a kind capable of increasing the conductivity. However, the basic or starting materials should be free from activating metals. After melting to result in a desired form, or else after shaping the molten starting material, the articles or objects made of the starting material, being more or less transmitting or pervious to light, are then given a perfect polish. After the polishing, either by chemical or by physical treatment, the activating material is deposited or precipitated upon the ensuing article. The most suitable way of accomplishing this is by vaporizing the metal on the surface in vacuo. After the metallized coat or film has thus been uniformly applied, opposite points of the article are connected with the positive and the negative poles of a source of potential supply (battery), though care must be taken so that between opposite sides of the article there will be no conducting particles of metal. Next, the body thus pre-treated is placed into an annealing furnace or leer, which, for the sake of more efficient temperature control is heated electrically, with voltage being impressed upon the metal electrodes. As a result of the rise of temperature, the body of starting material which, at ordinary temperature hardly conducts current, is changed into a better conductor, while from one of the electrodes which consists of activating metal, metallic ions migrate into the basic material with the consequence that within a relatively large surface and depth of the layer, the activating metallic atoms will come to permeate the body in perfect uniformity as a result of the potential difference. After a definite quantity of electricity which is measurable by means of a milli-ammeter has flowed through the body with an incidental migration of the desired number of metallic ions, the current is disconnected and the desired light accumulator or light transformer or transducer is finished. If desired, it may be treated further by moderate annealing or glowing. Cooling may be effected at a high or a low rate, according to whether relatively great phosphorescence or fluorescence is wanted. For self-excitation, also radium or radium-bearing compounds may be incorporated in all bodies.

In what follows, a few examples shall be cited to illustrate the ways and means adapted to carry the invention into practice: (1) 10 grams $BaCO_3$ and 3 grams NaCl are fused to result in a tenuous plate or sheet. This plate is then polished. After polishing, a silver coating by vaporization is applied upon both faces by the aid of cathode spatter or disintegration. After placing the plate onto an electric furnace and heating at 800 degrees C., a voltage of 220 v. is impressed upon the plate. After two hours, the current is cut off and the finished luminescent plate is taken out of the furnace, is allowed to cool to ordinary temperature, and the silver is removed by grinding. The thickness of the experimental plate thus formed was 1 mm. and weighed 8 grams. (2) 50 grams of ZnS and 5 grams of $MgF_2$ are fused in a high-pressure furnace in the presence of nitrogen to result in a clear plate. This is followed by polishing and application of a copper film. To insure better terminal conditions, a copper electrode is laid upon the metallized surface. Next, the plate is placed into an electric furnace and voltage is applied.

| | | |
|---|---|---|
| Potential | volts | 1000 |
| Temperature | degrees C | 950 |
| Length of annealing | hours | 4 |
| Thickness of plate | mm | 1 |
| Yield | grams | 40 |

(3) 100 grams $Zn_2SiO_4$ and 10 grams LiCl are molten at 1600 degrees C. to result in a perfectly clear melt, the latter being cast into a plate. Deposited upon the polished faces are films of neodymium. After removal of the current lead, the plate is brought into the furnace and potential is applied.

| | | |
|---|---|---|
| Potential | volts | 2000 |
| Temperature | degrees C | 1050 |
| Length of heating | hours | 6 |
| Thickness of plate | mm | 1 |
| Yield | grams | 80 |

After an annealing time of 6 hours, the voltage is removed. The plate is allowed to cool down to 400 degrees during 4 hours; the plate is then taken out of the furnace and allowed to cool to room temperature.

(4) 100 grams ZNO BaO (SiO₂)₂ and 10 grams LiCl are fused at 1600 degrees C. and cast into a plate. Upon the polished faces of the plate copper coats are deposited, the copper containing radium at the rate of 1×10⁻⁵ gram per gram copper. After placing the plate into an electrical furnace, potential is applied.

| | | |
|---|---|---|
| Potential | volts | 4000 |
| Temperature | degrees C | 800 |
| Length of heating | hours | 10 |
| Thickness of plate | mm | 1 |
| Yield | grams | 80 |

At the end of the heating period, voltage is removed followed by tempering at 500 degrees for four hours and cooling to room temperature.

It will be understood that the invention is not confined to the procedures hereinbefore described by way of example; in fact, it is applicable and adapted to any kind of raw or starting material. Among the activating metals may be mentioned primarily copper, silver, or else platinum, yttrium, neodymium, etc. The invention moreover is usable in all light accumulators and light transducers as well as in connection with substances which alter their dielectric constant when illuminated by light. What is here meant by light accumulators are substances which are capable of converting violet, ultra-violet and X-ray light, further cathode and radium rays, etc., into visible light, the light being accumulated or stored up and then re-emitted inside a relatively long period of time. What is here meant by light converters or transducers are substances which immediately convert violet, ultra-violet and X-rays and also cathode and radium radiations into visible light, with phosphoresence being invisible to the eye after removal or discontinuance of the irradiation.

Having described my invention, what I claim is:

1. The method of activating luminescent materials which comprises melting component parts of the luminescent material, forming a plate from the melted material, polishing at least one face of the formed plate, depositing a layer of activating metal upon the polished face, and electrolytically combining the deposited metal with the luminescent material of the formed plate.

2. The method of activating luminescent materials which comprises melting component parts of the luminescent material, forming a plate from the melted material, polishing at least one face of the formed plate, depositing a layer of activating metal upon the polished face, and thermally and electrolytically combining the deposited metal with the luminescent material of the formed plate.

3. The method of activating luminescent materials which comprises melting component parts of the luminescent material, forming a plate from the melted material, polishing at least one face of the formed plate, depositing a layer of activating metal upon the polished face, thermally and electrolytically combining the deposited metal with the luminescent material of the formed plate, and annealing the activated luminescent material of the formed plate.

4. The method of activating luminescent materials which comprises melting component parts of the luminescent material, forming a plate from the melted material, polishing at least one face of the formed plate, depositing a layer of activating metal upon the polished face, and electrolytically combining the deposited metal with the luminescent material of the formed plate.

5. The method of preparing an activated luminescent material screen which comprises melting component parts of the luminescent material, forming a plate from the melted material, polishing at least one face of the formed plate, depositing a layer of activating metal upon the polished face, electrolytically combining a portion of the deposited metal with the luminescent material of the formed plate, and subsequently removing from said face the uncombined portion of the metal.

6. The method of preparing an activated luminescent material screen which comprises melting component parts of the luminescent material, forming a plate from the melted material, polishing at least one face of the formed plate, depositing a layer of activating metal upon the polished face, and electrolytically combining a portion of the deposited metal with the luminescent material of the formed plate, and subsequently removing from said face the uncombined metal.

7. The method of preparing an activated luminescent material screen which comprises melting component parts of the luminescent material, forming a plate from the melted material, polishing at least one face of the formed plate, depositing a layer of activating metal upon the polished face, and thermally and electrolytically combining a portion of the deposited metal with the luminescent material of the formed plate, and subsequently removing from said face the uncombined metal.

8. The method of preparing an activated luminescent material screen which comprises melting component parts of the luminescent material, forming a plate from the melted material, polishing at least one face of the formed plate, depositing a layer of activating metal upon the polished face, thermally and electrolytically combining a portion of the deposited metal with the luminescent material of the formed plate, removing from said face the uncombined metal and subsequently annealing the activated luminescent material of the formed plate.

9. The method of preparing an activated luminescent plate which comprises the steps of fusing component parts of said luminescent plate, casting the fused salts to form a transparent plate having two opposed faces, polishing said faces of the formed plate, vaporizing a metallic coating upon each of the polished faces, electrolytically combining a portion of said metallic coatings with said luminescent plate by applying electrical potential between the said metallic coatings, simultaneously heating the transparent plate to a predetermined temperature for a predetermined time to give substantial increase in conductivity and uniform penetration of metallic ions from said portion of the coatings, removing the applied potential, and cooling the heated plate.

10. The method of preparing an activated luminescent plate which comprises the steps of fusing component parts of said luminescent plate, casting the fused salts to form a transparent plate having two opposed faces, polishing said faces of the formed plate, coating each of the polished faces with a metallic layer, electrolytically combining a portion of said metallic coatings with said luminescent plate by applying electrical potential between said metallic layers, simultaneously heating the transparent plate to a predetermined temperature for a predetermined time to give substantial increase in conductivity and uniform penetration of metallic ions from said portion of the coatings, removing the applied potential and cooling the heated plate.

11. The method of preparing an activated luminescent plate which comprises the steps of fusing component parts of said luminescent plate, casting the fused salts to form a transparent plate having two opposed faces, polishing said faces of the formed plate, coating each of the polished faces with a metallic layer, electrolytically combining a portion of said metallic coatings with said luminescent plate by applying electrical potential between said metallic layers, simultaneously heating the transparent plate to a predetermined temperature for a predetermined time to combine a portion of the metallic layers with said plate, said predetermined time and predetermined temperature being sufficient to give substantial increase in conductivity of said plate and substantially uniform penetration of ions from said metallic layers throughout said plate, removing the applied potential, cooling the heated plate, and subsequently removing from the faces of said plate the uncombined portion of the metallic layers.

LUDWIG WESCH.